United States Patent
Bourlon et al.

(10) Patent No.: US 7,299,631 B2
(45) Date of Patent: Nov. 27, 2007

(54) ARRANGEMENT FOR THE CONNECTION OF A BRAKE FLUID SUPPLY RESERVOIR

(75) Inventors: Philippe Bourlon, Dammartin en Goele (FR); François Gaffe, Bondy (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/399,722

(22) Filed: Apr. 7, 2006

(65) Prior Publication Data

US 2006/0185361 A1 Aug. 24, 2006

(51) Int. Cl.
*B60T 11/26* (2006.01)
(52) U.S. Cl. ...................................... 60/585
(58) Field of Classification Search ............... 60/585
See application file for complete search history.

(56) References Cited

U.S. PATENT DOCUMENTS 6,928,814 B2 * 8/2005 Lange .................. 60/585

FOREIGN PATENT DOCUMENTS

| DE | 4423621 | 1/1996 |
|----|---------|--------|
| DE | 19921195 | 12/1999 |
| FR | 2826326 | 12/2002 |

* cited by examiner

*Primary Examiner*—Michael Leslie
(74) *Attorney, Agent, or Firm*—Leo H. McCormick, Jr.; Sarah Taylor

(57) ABSTRACT

An arrangement (10) for the connection of a brake fluid supply reservoir (12) to a longitudinal brake master cylinder (14) of a motor vehicle, in which at least one lower supply pipe (16) connected to the reservoir is received in a complementary supply bore (18) of the master cylinder (14) and in which vertical immobilization structure (20) is interposed between the pipe (16) and the master cylinder (14). The arrangement is by an intermediate baseplate (22) that is connected to the reservoir (12) by at least one nozzle (24) including the supply pipe (16) and that is lowered vertically onto the master cylinder (14) and then immobilized on the master cylinder (14) by way of vertical immobilization structure (20) that directly snap-fastens to the master cylinder (14) to allow rapid attachment of the pipe (16) to the master cylinder (14).

10 Claims, 8 Drawing Sheets

ARRANGEMENT FOR THE CONNECTION OF A BRAKE FLUID SUPPLY RESERVOIR

The invention relates to an arrangement for the connection of a brake fluid supply reservoir to a brake master cylinder of a motor vehicle.

BACKGROUND OF THE INVENTION

The invention relates more specifically to an arrangement for the connection of a brake fluid supply reservoir to a longitudinal brake master cylinder of a motor vehicle, of the type in which at least one lower supply pipe connected to the reservoir is received in a complementary supply bore of the master cylinder and of the type in which vertical immobilization means are interposed between the pipe and the master cylinder.

Many examples of arrangements of this type are known.

These are mostly arrangements in which the supply reservoir comprises the supply pipe and this pipe is fastened directly to the reservoir.

Conventionally, the reservoir comprises two supply pipes each associated with supplying one of the two chambers of the master cylinder. The pipes are fitted directly into the master cylinder and the reservoir is locked by means of a pin which passes through the reservoir and through a bore of the master cylinder.

This design does not enable assembly of the reservoir on the master cylinder to be readily automated because the operation of fitting the pin proves to be particularly difficult.

Moreover, this design does not allow the standardized fitting of reservoirs of different types. Each reservoir must comprise specially adapted nozzles, which consequently means that the design of such a reservoir, generally produced by molding a plastic material, proves to be particularly complicated.

Moreover, it may be desirable in the context of master cylinder manufacture to connect the master cylinder to an independent reservoir. However, the conventional design mentioned above does not enable a tube from an independent reservoir to be rapidly connected into the supply bore of the master cylinder.

Finally, disassembling the reservoir makes it necessary to purge the brake circuit. The reason for this is that disassembling the reservoir deprives the master cylinder of its supply of brake fluid and may lead to air bubbles being introduced into the brake circuit.

SUMMARY OF THE INVENTION

The invention makes it possible to overcome all these disadvantages by providing an arrangement which allows rapid and standardized assembly of a reservoir, be it an independent reservoir or a reservoir fastened to the master cylinder.

To this end, the invention provides an arrangement of the above-described type, characterized in that it comprises an intermediate baseplate which is connected to the reservoir by at least one nozzle, which comprises the supply pipe and which is able to be lowered vertically onto the master cylinder and then immobilized on the master cylinder by way of vertical immobilization means cooperating by direct snap-fastening with the master cylinder to allow rapid fastening of the pipe to the master cylinder.

According to other features of the invention:

the reservoir is fastened to the baseplate, the nozzle of the baseplate being received in the reservoir and the baseplate being interposed between the reservoir and the master cylinder, the fastening of the reservoir to the baseplate is compatible with different types of reservoirs to allow the assembly of different reservoirs on the baseplate, as a variant, the reservoir is independent of the baseplate, the nozzle of the baseplate being connected to a nozzle of the reservoir by way of an independent tube, the vertical immobilization means comprise at least two arms which extend substantially vertically toward the master cylinder from a longitudinal edge of the baseplate and an arm which extends substantially vertically toward the master cylinder from an opposed longitudinal edge of the baseplate, first locking means being arranged in the vicinity of the ends of the arms to cooperate with second locking means borne by the master cylinder, the arms are flexible transversely so that, when the baseplate is lowered onto the master cylinder, the arms separate when passing over transverse studs of the master cylinder forming the second locking means and then retract when transverse bores arranged in the vicinity of the ends of the arms and forming the first locking means receive the transverse studs, the arms comprise guide channels for the studs, these channels being formed in inner vertical faces of the arms between their ends and the transverse bores and being intended to cooperate with upper chamfers of said studs to facilitate the separation of the arms, the arms are made of a plastic material, the baseplate comprises holding means for assembling the baseplate on the master cylinder, the opposed longitudinal edges of the baseplate are formed with indentations forming a dovetail to allow them to be held by two matching arms of an automated assembly robot.

The invention also relates to a method of assembling a reservoir baseplate on a master cylinder of the type according to an arrangement of the type described above, characterized in that it comprises:

a first step during which two arms of an assembly robot are each arranged in register with an indentation in the dovetail of the baseplate, a second step during which the arms are clamped on the baseplate so that the end of each of the arms enters the indentation in the corresponding edge of the baseplate, a third step during which the arms position the baseplate above the master cylinder, with the supply pipe being in register with the supply bore, a fourth step during which the arms lower the baseplate onto the master cylinder until the vertical immobilization means snap into place, and a fifth and final step during which the arms are separated from the baseplate.

Other features and advantages of the invention will become apparent on reading the detailed description which follows, an understanding of which will be provided by referring to the appended drawings.

DETAILED DESCRIPTION OF THE INVENTION

In the description which will follow, identical reference numbers are used to denote parts which are identical or have similar functions.

By convention, the terms "front", "rear", "upper" and "lower" respectively denote elements or positions disposed respectively toward the left, the right, the top or the bottom of FIGS. 1 to 8.

Figure 1:
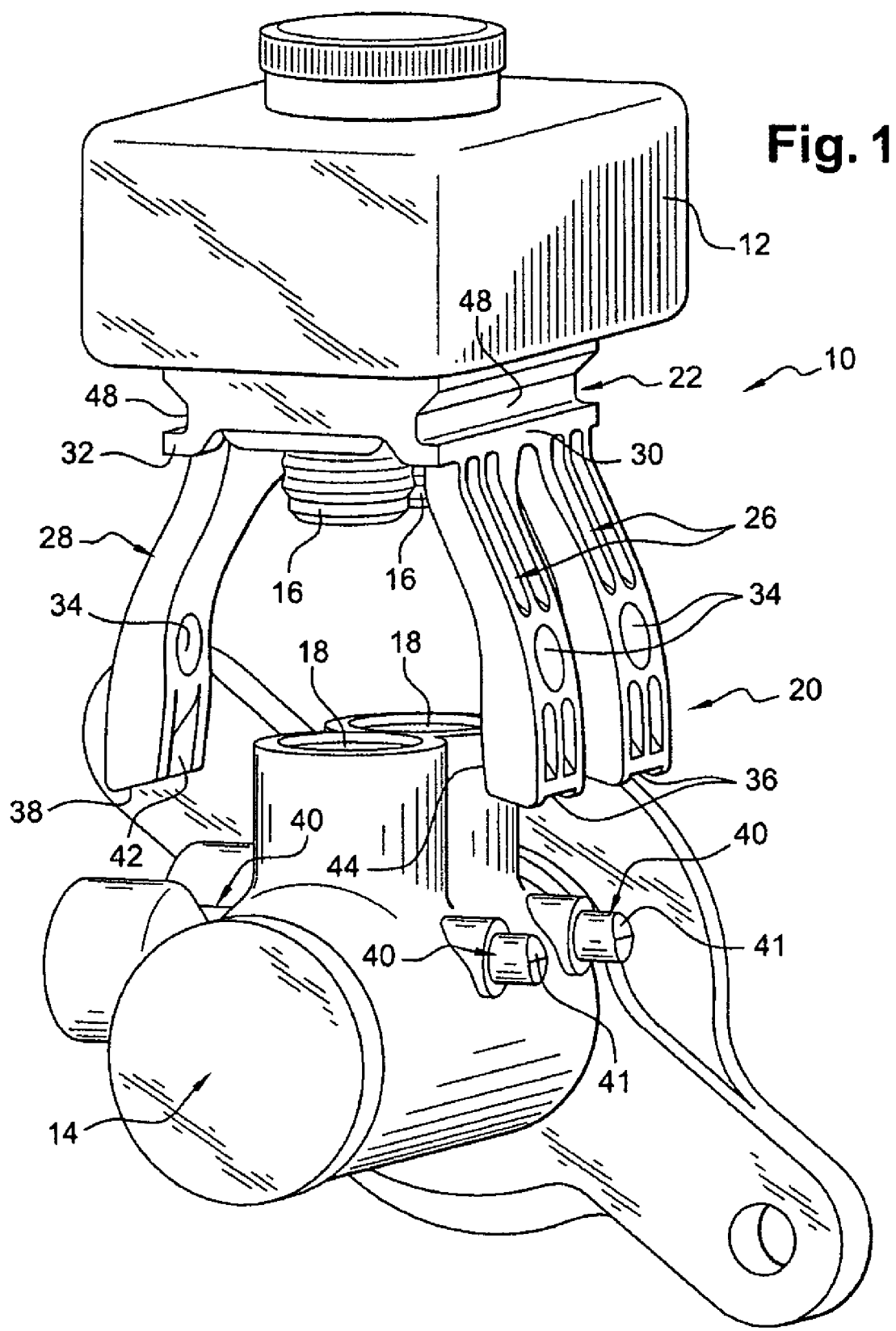
FIG. 1 is an exploded perspective view of an arrangement according to the invention.

FIG. 1 shows the whole of an arrangement 10 embodied according to the invention.

In a known manner, the arrangement 10 allows the connection of a brake fluid supply reservoir 12 to a longitudinal brake master cylinder 14 of a motor vehicle. At least one lower supply pipe 16, which is connected to the reservoir 12, is intended to be received in a complementary supply bore 18 of the master cylinder 14. Moreover, vertical immobilization means 20 are interposed between the pipe 16 and the master cylinder 14.

More specifically, the arrangement 10 comprises in a conventional manner two pipes 16 each intended to enter an associated supply bore 18 of the master cylinder 14. Each bore 18 is intended to supply brake fluid to an associated internal chamber of the master cylinder 14. Such a master cylinder 14, more commonly known as a "tandem" master cylinder, is intended to supply two independent brake circuits of the vehicle in which it is mounted with brake fluid under pressure.

In a conventional design (not shown), the reservoir 12 bears the pipes 16. Moreover, it is immobilized on the master cylinder 14 by means of a pin. Assembling such a pin is a particularly troublesome operation to carry out on an industrial scale.

The design according to the invention is particularly advantageous in that it allows rapid and standardized assembly of a reservoir 12, be it an independent reservoir 12 or a reservoir 12 fastened to the master cylinder 14. This design enables the reservoir 12 to be assembled in an industrial manner, that is to say on an automated production line.

According to the invention, the arrangement 10 comprises an intermediate baseplate 22 which is connected to the reservoir 12 by at least one nozzle 24, which comprises the supply pipe 16 and which is able to be lowered vertically onto the master cylinder 14 and then immobilized on the master cylinder 14 by way of vertical immobilization means 20 cooperating by direct snap-fastening with the master cylinder 14 to allow rapid fastening of the pipe 16 on the master cylinder 14.

Figure 8:
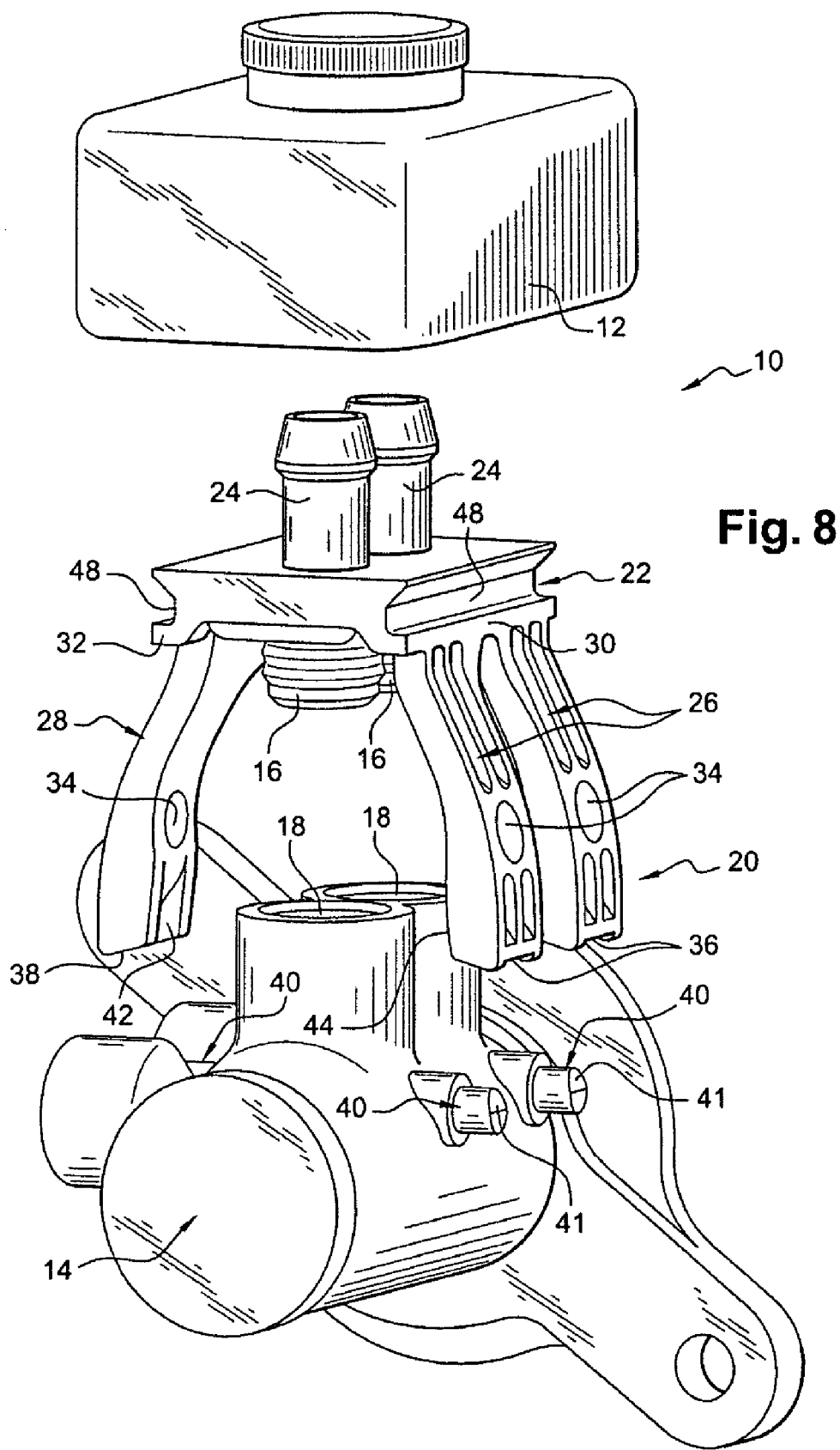
FIG. 8 is an exploded perspective view of a second arrangement according to the invention.

As can be seen from FIG. 8, in the preferred embodiment of the invention, the base comprises two nozzles 24 which each communicate with a pipe 16.

More specifically, the reservoir 12 is fastened to the baseplate 22, the nozzles 24 of the baseplate being received and, in particular, fitted into the reservoir 12. The baseplate 22 is interposed between the reservoir 12 and the master cylinder 14.

The reservoir 12 may be fastened to the baseplate 22 by means of the nozzles 24 alone. However, in a manner which does not limit the invention, any other way of producing this fastening may be contemplated.

Advantageously, the fastening of the reservoir 12 to the baseplate is compatible with different types of reservoirs 12. This configuration makes it possible to assemble on the baseplate 22 various reservoirs of different shapes and capacities, each adapted to a specific vehicle.

The baseplate is also particularly suited to an assembly comprising an independent reservoir 12.

Thus, as a variant, the reservoir 12 may be independent of the baseplate 22, the nozzles 24 of the baseplate 22 being connected to a nozzle (not shown) of an independent reservoir by means of an independent tube (not shown).

Such an independent reservoir 12 may, for example, be used for successively testing a number of master cylinders 14, with the tubes being simply disconnected from the nozzles 24 during each change of master cylinder 14.

According to the invention, the vertical immobilization means of the baseplate 22 comprise at least two arms 26 which extend substantially vertically toward the master cylinder 14 from a longitudinal edge 30 of the baseplate 22 and an arm 28 which extends substantially vertically toward the master cylinder 14 from an opposed longitudinal edge 32 of the baseplate 22.

First locking means 34 are arranged in the vicinity of the ends 36, 38 of the arms to cooperate with second locking means 40 borne by the master cylinder 14. These first means 34 and these second means 40 will be described in more detail in the remainder of the present description.

Figure 4:
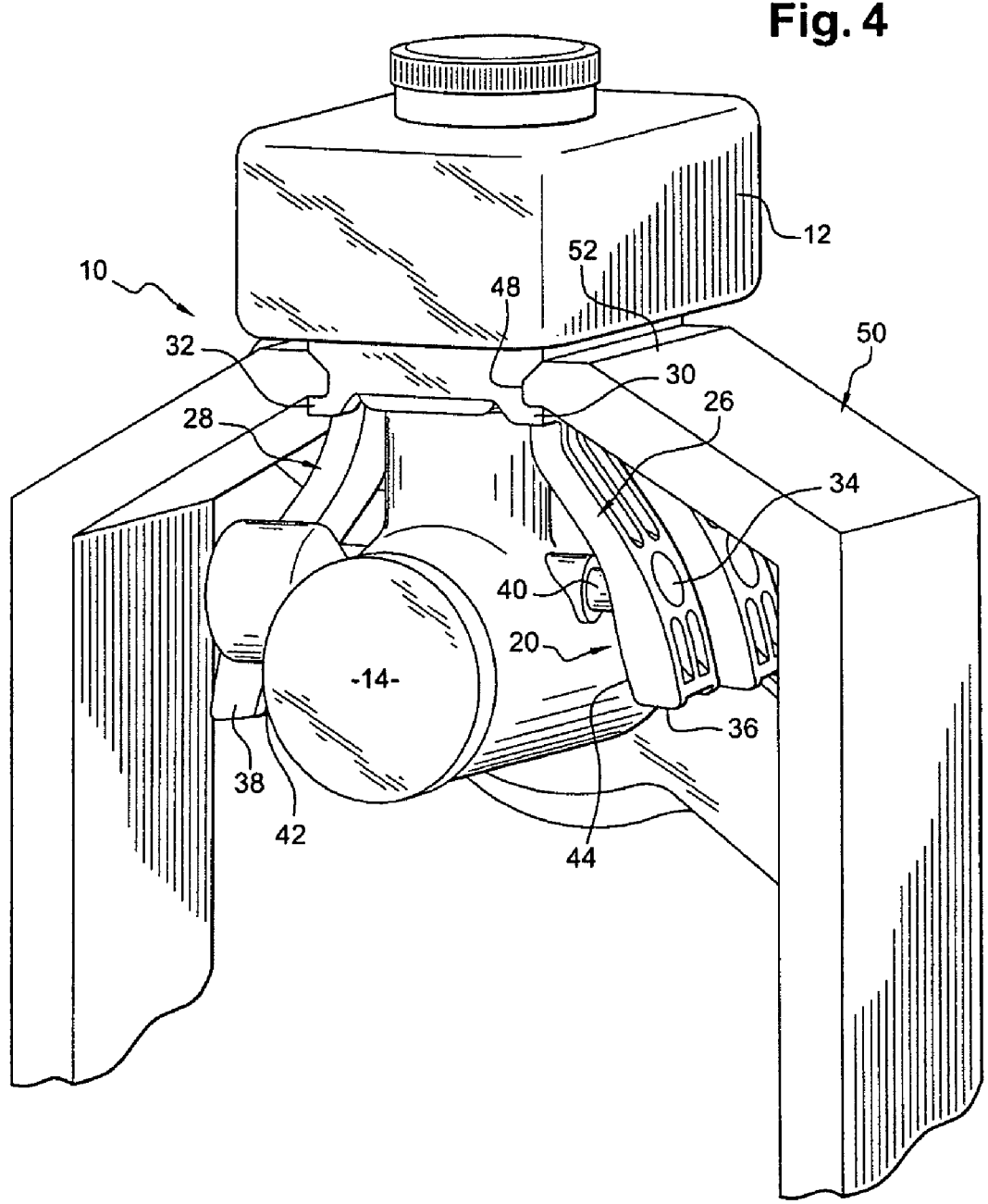
FIGS. 4 and 5 are perspective views illustrating the fourth step of the method according to the invention.
Figure 5:
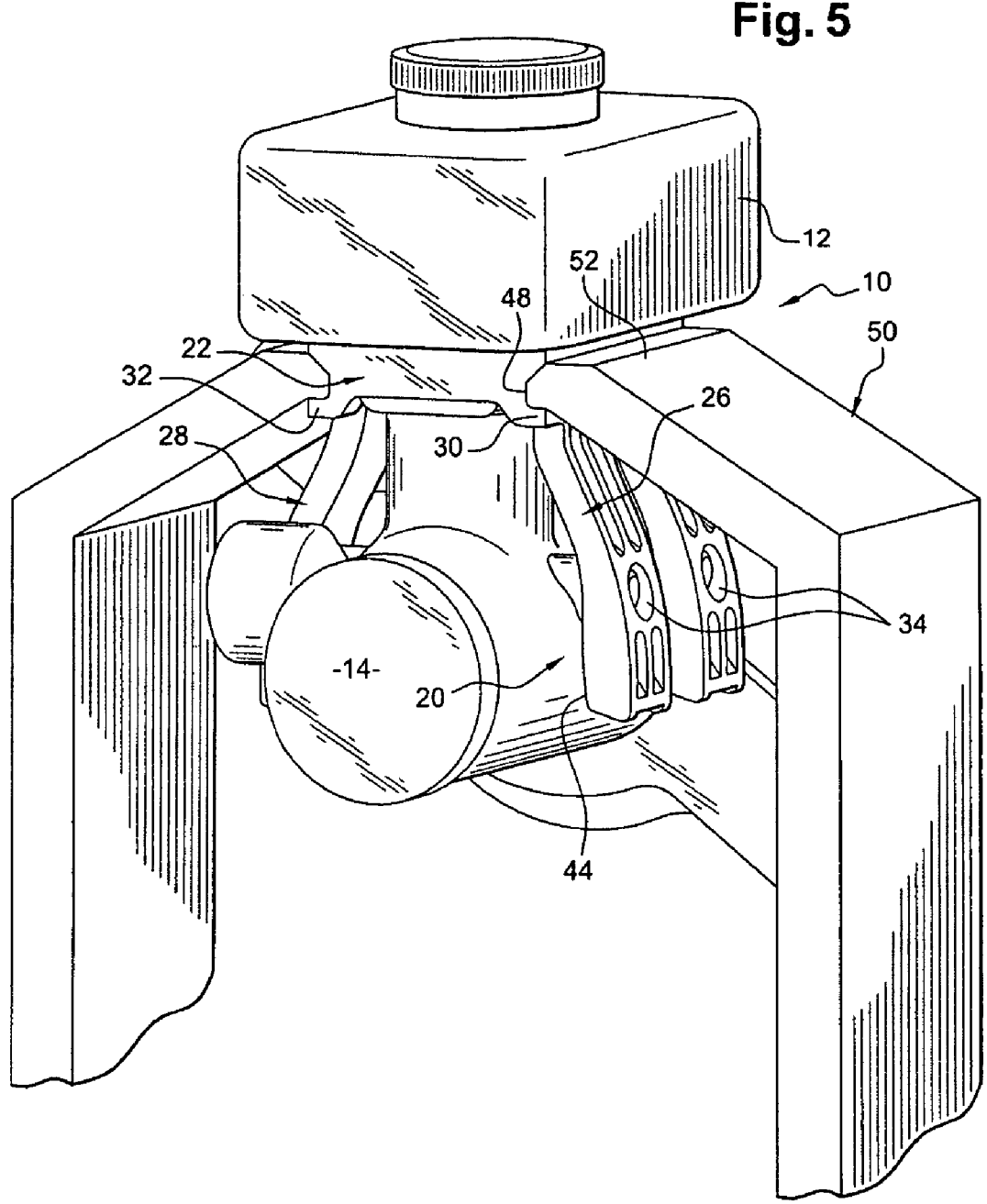
Figure 6:
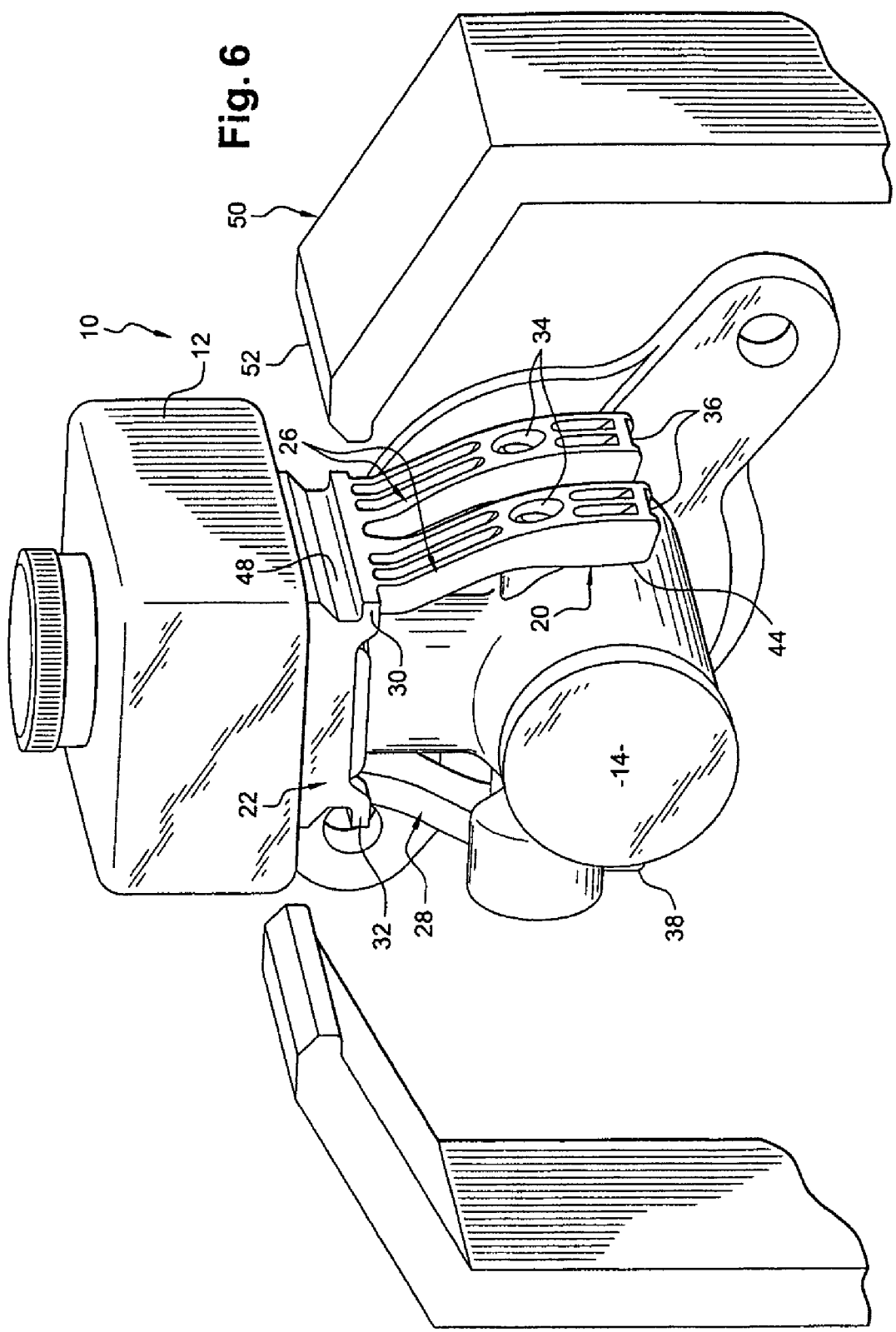
FIG. 6 is a perspective view illustrating the fifth step of the method according to the invention.
Figure 7:
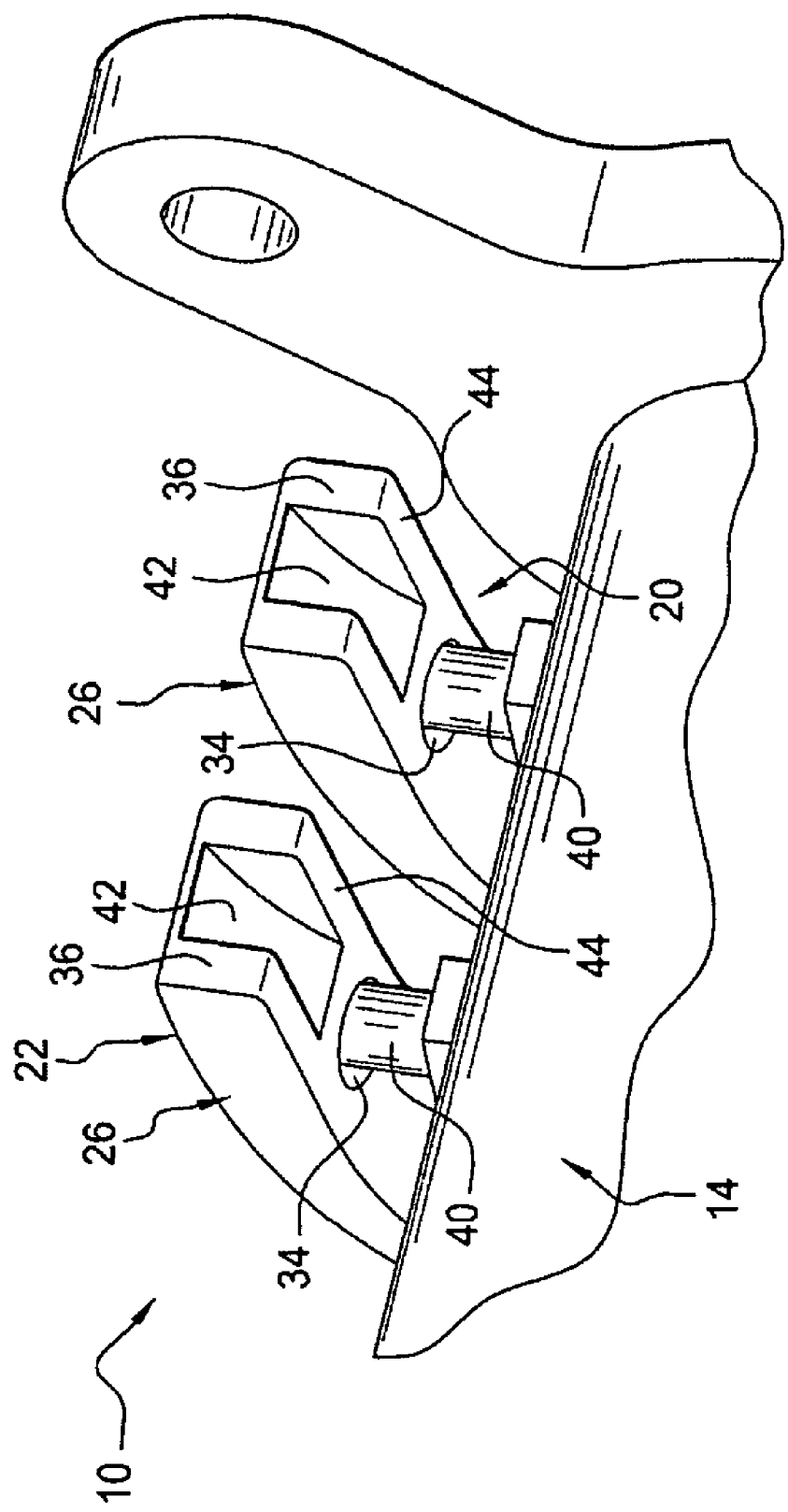
FIG. 7 is a perspective view of a detail as seen from below the arrangement during the fourth step of the method.

More specifically, the arms 26, 28 are flexible transversely so that, when the baseplate 22 is lowered onto the master cylinder 14, the arms 26, 28 separate when passing over transverse studs 40 of the master cylinder forming the second locking means, as represented in FIG. 4, and then retract when transverse bores 34 arranged in the vicinity of the ends of the arms and forming the first locking means receive the transverse studs 40, as represented in FIG. 5.

The studs 40 advantageously extend transversely from the cylindrical barrel of the master cylinder 14.

Advantageously, to facilitate the introduction of the transverse studs 40 in the transverse bores 34, the arms 26, 28 comprise guide channels 42 for the studs 40, these channels being formed in inner vertical faces 44 of the arms 26, 28 between their ends 36 and the transverse bores 34 and being intended to cooperate with upper chamfers 41 of said studs 40 to facilitate the separation of the arms 26, 28.

As has been seen above, the arms 26, 28 are made of a substantially flexible elastic material to allow them to separate. Any material having such properties may be used to effectively implement the invention. However, in the preferred embodiment of the invention, the arms 26, 28 are made of a plastic material.

Moreover, according to the invention, the baseplate 22 comprises holding means 48 for assembling the baseplate 22 on the master cylinder 14.

These holding means could be intended for an operator to take hold of the baseplate 22 manually.

However, in the preferred embodiment of the invention, these means 48 are designed so that the baseplate 22 can be held for automated assembly purposes.

To this end, the opposed longitudinal edges 30, 32 of the baseplate are formed with a dovetail to allow them to be held by two matching arms 50 of an automated assembly robot. Each edge comprises an indentation 48, the two indentations 48 forming the dovetail. These arms 50, whose ends 52 are intended to cooperate with the dovetail indentations 48, have been represented in FIGS. 2 to 6.

Figure 2:
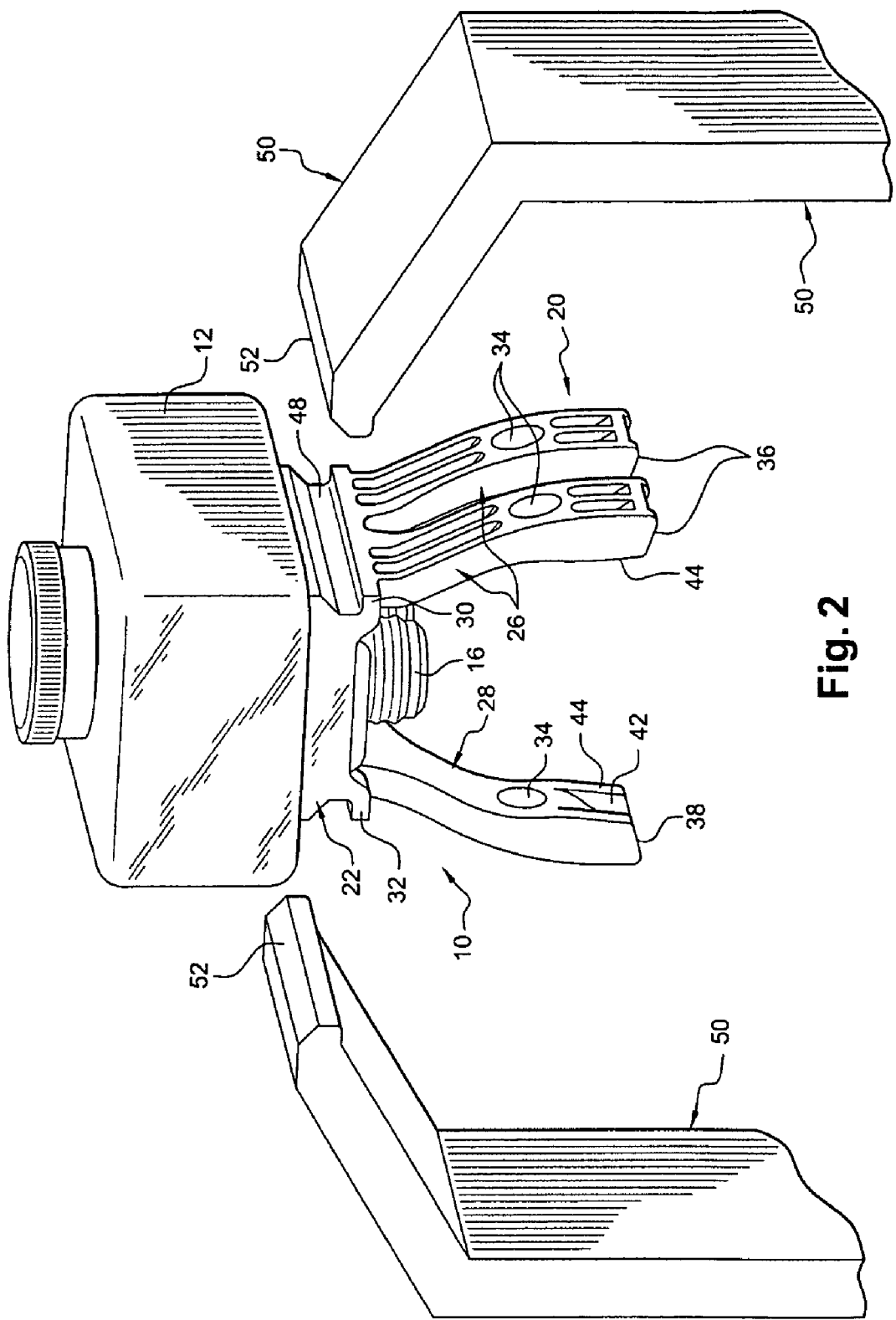
FIG. 2 is a perspective view illustrating the first step of the method according to the invention.
Figure 3:
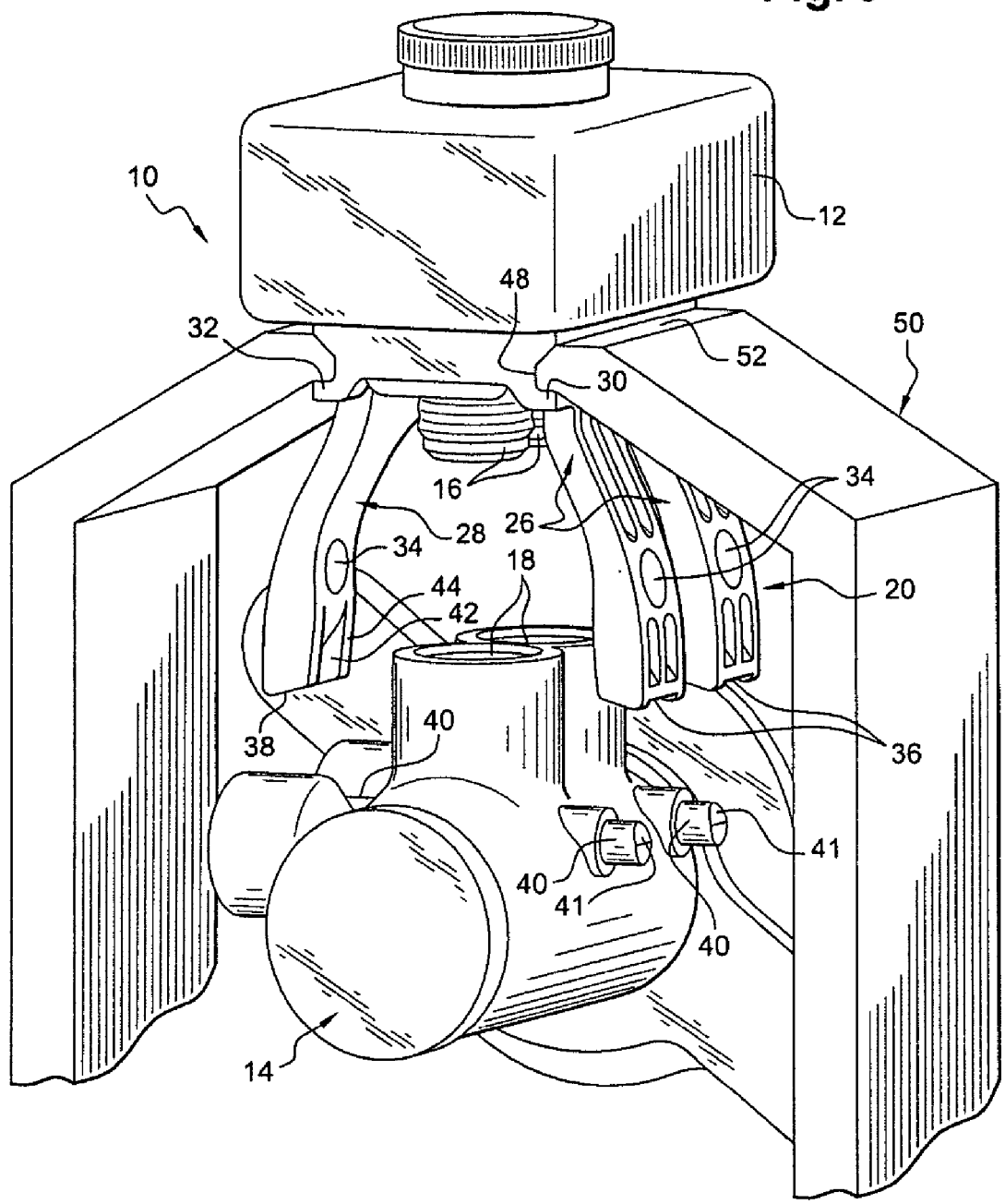
FIG. 3 is a perspective view illustrating the second and third steps of the method according to the invention.

In this configuration, a method of assembling a reservoir baseplate 22 on a master cylinder 14, as are described above, comprises a first step during which the two arms 50 of an assembly robot are each arranged in register with an edge 30, 32 of the dovetail 48 of the baseplate 22, as represented in FIG. 2. During this step, the arms 50 may, for example, take hold of the baseplate 22 in a storage facility for baseplates 22.

Next, the method comprises a second step during which the arms 50 are clamped onto the baseplate 22 so that the end of each of the arms 50 enters the indentation 48 in the corresponding edge 30, 32 of the baseplate 22. In this configuration, the arms 50 retain the baseplate 22 in a manner which is substantially analogous to that represented in FIG. 3. Following this second step, the arms 50 can be moved in order, in a third step, to move the baseplate into a position, represented in FIG. 3, in which the arms 50 position the baseplate 22 above the master cylinder 14, the supply pipe 16 being arranged in register with the supply bore 18 of the master cylinder 14.

Next, the method comprises a fourth step, represented in FIGS. 4 and 5, during which the arms 26, 28 lower the baseplate 22 onto the master cylinder until reaching a position in which the vertical immobilization means 34, 40 snap into place, as represented more specifically in FIG. 5.

Finally, the method comprises a fifth and final step during which the arms 50 are separated from the baseplate 22, their ends 52 being withdrawn from the indentations 48 and thereby releasing the master cylinder 14 provided with its baseplate 22.

What is claimed is:

1. An arrangement (10) for the connection of a brake fluid supply reservoir (12) to a longitudinal brake master cylinder (14) of a motor vehicle having at least one lower supply pipe (16) connected to the reservoir located in a complementary supply bore (18) of the master cylinder (14) and in which vertical immobilization means (20) are interposed between the pipe (16) and the master cylinder (14), characterized by the arrangement (10) comprising an intermediate baseplate (22) which is connected to the reservoir (12) by at least one nozzle (24) and the supply pipe (16), and wherein said supply pipe (16) is lowered vertically onto the master cylinder (14) and then immobilized on the master cylinder (14) by way of vertical immobilization means (20) that cooperate by direct snap-fastening with the master cylinder (14) to allow rapid fastening of the pipe (16) to the master cylinder (14).

2. The arrangement (10) according to claim 1, characterized in that the reservoir (12) is fastened to the baseplate (22), the nozzle (24) of the baseplate is received in the reservoir (12) and the baseplate (22) is interposed between the reservoir (12) and the master cylinder (14).

3. The arrangement (10) according to claim 2, characterized in that the fastening of the reservoir (12) to the baseplate (22) is compatible with different types of reservoirs (12) to allow the assembly of different reservoirs (12) on the baseplate (22).

4. The arrangement (10) according to claim 2, characterized in that the vertical immobilization means (20) comprise at least two arms (26) which extend substantially vertically toward the master cylinder (14) from a longitudinal edge (30) of the baseplate (22) and an arm (28) which extends substantially vertically toward the master cylinder (14) from an opposed longitudinal edge (32) of the baseplate (22), first locking means (34) being arranged in the vicinity of the ends (36, 38) of the arms (26, 28) to cooperate with second locking means (40) borne by the master cylinder (14).

5. The arrangement (10) according to claim 4, characterized in that the arms (26, 28) are flexible transversely so that, when the baseplate (22) is lowered onto the master cylinder (14), the arms (26, 28) separate when passing over transverse studs (40) of the master cylinder forming the second locking means and then retract when transverse bores (34) arranged in the vicinity of the ends (36, 38) of the arms (26, 28) and forming the first locking means receive the transverse studs (40).

6. The arrangement (10) according to claim 5, characterized in that the arms (26, 28) comprise guide channels (42) for the studs (40), these channels being formed in inner vertical faces (44) of the arms (26, 28) between their ends (36, 38) and the transverse bores (34) and being intended to cooperate with upper chamfers (41) of said studs (40) to facilitate the separation of the arms (26, 28).

7. The arrangement (10) according to claim 6, characterized in that the arms (26, 28) are made of a plastic material.

8. The arrangement (10) according to claim 7, characterized in that the baseplate (22) comprises holding means (48) for assembling the baseplate (22) on the master cylinder (14).

9. The arrangement (10) according to claim 8, characterized in that the opposed longitudinal edges (30, 32) of the baseplate (22) are formed with indentations (48) forming a dovetail to allow them to be held by two matching arms (50) of an automated assembly robot.

10. The arrangement (10) according to claim 8 wherein the reservoir baseplate (22) is assembled on a master cylinder (14) through the following steps:

in a first step during which two arms (50) of an assembly robot are each arranged in register with an indentation (48) in an edge (30, 32) of the dovetail of the baseplate (22), in a second step during which the arms (50) are clamped on the baseplate (22) so that the end (52) of each of the arms (50) enters the indentation (48) in the corresponding edge (30, 32) of the baseplate (22), in a third step during which the arms (60) position the baseplate (22) above the master cylinder (14), with the supply pipe (16) being in register with the supply bore (18), in a fourth step during which the arms (50) lower the baseplate (22) onto the master cylinder (14) until the vertical immobilization means (20) snap into place, and in a fifth and final step during which the arms (50) are separated from the baseplate (22).

* * * * *